(12) United States Patent
Cen et al.

(10) Patent No.: US 11,113,835 B2
(45) Date of Patent: Sep. 7, 2021

(54) PLANT POINT CLOUD ACQUISITION, REGISTRATION AND OPTIMIZATION METHOD BASED ON TOF CAMERA

(71) Applicant: Zhejiang University, Hangzhou (CN)

(72) Inventors: Haiyan Cen, Hangzhou (CN); Yong He, Hangzhou (CN); Zhihong Ma, Hangzhou (CN); Hui Fang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 16/885,682

(22) Filed: May 28, 2020

(65) Prior Publication Data
US 2020/0388044 A1    Dec. 10, 2020

(30) Foreign Application Priority Data

Jun. 6, 2019    (CN) .......................... 201910494632.0

(51) Int. Cl.
| | | |
|---|---|---|
| *G06T 7/60* | (2017.01) | |
| *G06T 7/80* | (2017.01) | |
| *G06K 9/00* | (2006.01) | |
| *G06T 7/00* | (2017.01) | |

(52) U.S. Cl.
CPC ............ *G06T 7/60* (2013.01); *G06K 9/00657* (2013.01); *G06T 7/0002* (2013.01); *G06T 7/80* (2017.01);
(Continued)

(58) Field of Classification Search
None
See application file for complete search history.

(56) References Cited

U.S. PATENT DOCUMENTS

| | | | |
|---|---|---|---|
| 2013/0222369 A1* | 8/2013 | Huston ................. | G06T 19/006 345/419 |
| 2014/0016857 A1* | 1/2014 | Richards .................. | G06T 7/55 382/154 |

(Continued)

OTHER PUBLICATIONS

Y. Ye and Z. Song, "An accurate 3D point cloud registration approach for the turntable-based 3D scanning system," 2015 IEEE International Conference on Information and Automation, 2015, pp. 982-986, doi: 10.1109/ICInfA.2015.7279429. (Year: 2015).*

(Continued)

*Primary Examiner* — James A Thompson
(74) *Attorney, Agent, or Firm* — Wenderoth, Lind & Ponack, L.L.P.

(57) ABSTRACT

The present invention discloses a plant point cloud acquisition, registration, and optimization method based on a time of flight (TOF) camera, which includes the following steps: (1) placing a to-be-tested plant on a turntable, adjusting a view angle of the TOF camera, and aligning the TOF camera with the to-be-tested plant; (2) turning on the turntable so that it rotates automatically, and enabling the TOF camera to acquire point cloud data of the to-be-tested plant at intervals; (3) performing real-time preprocessing on each frame of point cloud data acquired by the TOF camera; (4) performing registration and optimization on every two adjacent frames of point cloud data, and then integrating the data to obtain complete plant point cloud data; and (5) using statistical filtering to remove the discrete noise in the plant point cloud data obtained in the registration and optimization process to obtain final point cloud data.

9 Claims, 3 Drawing Sheets

(52) U.S. Cl.
CPC ...... *G06T 7/97* (2017.01); *G06T 2207/10028* (2013.01)

(56) References Cited

U.S. PATENT DOCUMENTS

| | | | | |
|---|---|---|---|---|
| 2017/0223338 | A1* | 8/2017 | Kang | G01B 11/24 |
| 2019/0122375 | A1* | 4/2019 | Wang | G06K 9/6211 |
| 2020/0033312 | A1* | 1/2020 | Overton | G06K 9/6201 |
| 2020/0126208 | A1* | 4/2020 | Ponto | G06T 11/203 |
| 2020/0174107 | A1* | 6/2020 | Briggs | G06T 7/50 |
| 2020/0388004 | A1* | 12/2020 | Zhang | G06T 3/0075 |

OTHER PUBLICATIONS

L. He, Z. Li and S. Chen, "Aligning Algorithm of 3D Point Cloud Model Based on Dimensionality Reduction," 2017 2nd International Conference on Multimedia and Image Processing (ICMIP), 2017, pp. 281-285, doi: 10.1109/ICMIP.2017.34. (Year: 2017).*

X. Chai, F. Wen, X. Cao and K. Yuan, "A fast 3D surface reconstruction method for spraying robot with time-of-flight camera," 2013 IEEE International Conference on Mechatronics and Automation, 2013, pp. 57-62, doi: 10.1109/ICMA.2013.6617893. (Year: 2013).*

Office Action dated Jan. 12, 2021, in corresponding Chinese Patent Application No. 201910494632.0, with English translation.

Jian et al., "Single Kinect and Rotating Platform for Full-View 3D Reconstruction", Journal of Data Acquisition and Processing, vol. 34, No. 2, Mar. 2019, pp. 205-213, with English Abstract and cited in CA.

Hu et al., "Study on 3D Reconstruction and Growth Measurement Methods for Leafy Crops Based on Depth Camera", Populus euphratica, "Information Technology Series of Full-Text Databases of Chinese Doctoral Dissertations", No. 08, Aug. 15, 2018, with with English Abstract and cited in CA.

* cited by examiner

ing steps:
PLANT POINT CLOUD ACQUISITION, REGISTRATION AND OPTIMIZATION METHOD BASED ON TOF CAMERA

TECHNICAL FIELD

The present invention relates to the technical field of digital agriculture, and in particular, to a plant point cloud acquisition, registration and optimization method based on a time of flight (TOF) camera.

BACKGROUND

At present, in the industrial field, many detection methods and devices have been applied to acquire three-dimensional structures of objects. For example, scanning devices based on a lidar, structured light, a TOF camera, and multi-view stereo algorithms have been widely used.

In the agricultural field, due to the plant dynamics, flexibility, and diffuse reflection properties of plant leaf materials, the research and application of related instruments have been started late.

TOF is a simple, easy to install, and cost-effective technology. Featuring good environmental adaptability and high cost performance, a TOF camera uses an active light source to obtain three-dimensional point clouds of plant objects. The TOF camera illuminates a spot with a modulated light source, and then measures a phase difference of a reflected wave. Because the speed of light is constant, the TOF camera can calculate a distance to each point in the spot based on the time spent by the light to return to the camera.

However, using a single TOF camera can only obtain spatial data information of a single angle of an object. In addition, the plant object is seriously shielded by its leaves. Therefore, it is necessary to shoot and register the plant object from multiple angles. Due to the characteristics of the plant leaf material, there are certain errors in the distance measurement of the TOF camera, which is likely to cause the leaf layering phenomenon during registration. Therefore, further optimization is needed to improve the accuracy of registration results, so as to obtain complete and correct plant point cloud data for subsequent calculation and research.

In order to solve the above problems, some experts have proposed the following solutions:

(1) Use a marked controllable turntable to register a point cloud.

(2) Adjust an angle of the controllable turntable by setting and fixing a rotating shaft, and then perform the registration.

The above method can improve the accuracy of registration and avoid the error caused by the traditional ICP registration algorithm, but it has higher requirements for the mark and detection of the turntable and the setting accuracy of the rotating shaft.

Usually, noise reduction is used to improve accuracy of the registration results, but this method cannot effectively solve the plant leaf layering phenomenon. As a result, the obtained plant point cloud data still cannot be applied to subsequent calculation and research.

SUMMARY

The present invention provides a plant point cloud acquisition, registration, and optimization method based on a TOF camera, which can effectively solve the local point cloud layering phenomenon.

The present invention has the following technical solutions.

A plant point cloud acquisition, registration, and optimization method based on a TOF camera includes the following steps:

(1) Place a to-be-tested plant on a turntable, adjust a view angle of the TOF camera, and align the TOF camera with the to-be-tested plant.

(2) Turn on the turntable so that it rotates automatically, and enable the TOF camera to acquire point cloud data of the to-be-tested plant at intervals.

(3) Perform real-time preprocessing on each frame of point cloud data acquired by the TOF camera.

(4) Perform registration and optimization on every two adjacent frames of point cloud data, and then integrate the data to obtain complete plant point cloud data.

(5) Use statistical filtering to remove the discrete noise in the plant point cloud data obtained in the registration and optimization process to obtain final point cloud data.

Step (1) includes:

(1-1) Calibrate the TOF camera with Zhang Zhengyou method, place the to-be-tested plant on the turntable, adjust the view angle of the TOF camera, and align the TOF camera with the to-be-tested plant.

(1-2) Use a plane fitting method to obtain a fitted plane of a tabletop, and obtain an angle between the normal vector of the fitted plane of the tabletop and each axis of the right-hand coordinate system.

Preferably, in step (1-1), a high angle of the TOF camera relative to the plant is 30° to 45°.

As there is an angle between the view angle of the TOF camera and a central axis of the plant (or a central axis of the turntable), to ensure that only point cloud data of the plant and a pot is retained after the subsequent pass-through filtering, it is necessary to rotate each frame of point cloud data to adjust the view angle. Therefore, calculate the angle between the normal vector of the plane of the tabletop and each axis of the right-hand coordinate system, and rotate each frame of the point cloud data according to the angle.

Preferably, step (1-2) includes:

(1-2a) Perform extreme pass-through filtering on each frame of point cloud data so that only part of the visible tabletop is retained.

(1-2b) Obtain multiple fitted planes through RANSAC plane fitting, obtain a normal vector of each fitted plane, and determine the fitted plane of the tabletop based on an angle relationship between the normal vector of the fitted plane and the y-axis of the right-hand coordinate system and a point cloud quantity threshold. The fitted plane of the tabletop meets the following formulas:

$$\min\{\theta, \theta = \arccos(\vec{n}_{fitted\ plane}, \vec{y})\} \quad (1)$$

$$\max\{n_y, n_y \in \{n_y^i, i=1,2\ldots m\}\} \quad (2)$$

$$num_{plane} \geq num_{threshold} \quad (3)$$

$\vec{n}_{fitted\ plane}$ is the normal vector of the fitted plane; $\vec{y}$ is the y-axis of the right-hand coordinate system; $\theta$ is the angle between the normal vector of the fitted plane and the y-axis of the right-hand coordinate system; $n_y^i$ is a y-axis component of the normal vector of each fitted plane, m is a quantity of fitted planes, and $n_y$ is a y-axis component of a normal of the fitted plane; $num_{plane}$ is a quantity of point clouds of the fitted plane; and $num_{threshold}$ is the point cloud quantity threshold.

(1-2c) After determining the fitted plane of the tabletop, obtain the angle between the normal vector of the fitted plane of the tabletop and each axis of the right-hand coordinate system.

The point cloud quantity threshold $num_{threshold}$ needs to be determined through multiple tests based on a specific sensor and acquired object data.

In step (2), the sampling intervals of the TOF camera are the same, and the sampling interval should ensure that there is an overlap between two adjacent frames of point cloud data.

Step (3) includes:

(3-1) Rotate each frame of the point cloud data obtained by the TOF camera according to an angle between a normal vector of a fitted plane of a tabletop and each axis of a right-hand coordinate system.

(3-2) Perform pass-through filtering on the rotated point cloud data to remove background and obtain an unordered point cloud.

(3-3) Use bilateral filtering to smoothen the unordered point cloud.

Performing pass-through filtering on the rotated point cloud data can effectively remove the background and reduce the memory space occupied by the point cloud data. The point cloud obtained through the pass-through filtering is an unordered point cloud. Due to a low signal-to-noise ratio of the TOF camera, bilateral filtering suitable for unordered point clouds is used for smoothing.

The preprocessed point cloud data will be registered and optimized to eliminate local point cloud layering.

Registration and optimization are performed concurrently with acquisition.

Step (4) includes:

(4-1) Transform a coordinate system of a second point cloud P2 to a coordinate system of a first point cloud P1 to obtain a point cloud P2'.

(4-2) Triangulate P1 and P2', remove boundary points that do not form a triangular patch, but retain points inside that do not form a triangular patch.

(4-3) Search for a triangular patch of P2' in the neighborhood of each triangular patch in P1, and check whether the triangular patch in P1 intersects with or is in parallel to the triangular patches within the neighborhood.

(4-4) According to the intersection and parallelism relationship, adjust a point cloud set of P2' that is within the neighborhood of the triangular patch in P1 to obtain a point cloud P2''.

(4-5) Add points in P2' that do not form a triangular patch to P2'', and then perform downsampling to obtain a point set P2' deal.

(4-6) Transform a coordinate system of an i-th point cloud Pi to the coordinate system of the first point cloud P1 to obtain a point cloud Pi', and repeat steps (4-2) to (4-5) to obtain Pi' deal, where i≥3.

(4-7) Integrate P1, P2' deal, and Pi' deal to obtain the complete plant point cloud data.

Step (4-1) includes:

(4-1a) Initialize a global matrix Tg as a unit matrix.

(4-1b) Carry out coarse registration and fine registration for the first point cloud P1 and the second point cloud P2 through an FPFH algorithm and an ICP algorithm in turn to obtain a transformation matrix To and apply it to P2, so that the coordinate system of P2 is transformed to the coordinate system of P1 to obtain the point cloud P2'; and update Tg so that Tg=Tg×To.

In step (4-2), triangulate P1 and P2' through greedy triangulation.

The boundary points that do not form a triangular patch are usually noisy points, but the points inside that do not form a triangular patch are not necessarily noisy points. Therefore, in step (4-2), only the boundary points that do not form a triangular patch are removed, while the points inside that do not form a triangular patch are directly retained.

In step (4-2), search for the boundary points based on a KD tree and normal vector method, which includes:

(4-2a) Search for neighboring points of a point that does not form a triangular patch through the KD tree. When a quantity of neighboring points of a point is less than a threshold, the point is an outlier.

(4-2b) According to the quantity of neighboring points of the point that does not form a triangular patch, use a PCA method to calculate a normal vector of the point, determine a connection line between a view point and the point, and calculate an angle between the connection line and the normal vector. If the angle is greater than a threshold, the point is a flying pixel point.

Both outliers and flying pixel points are boundary points.

The step (4-3) of checking whether the triangular patch in P1 intersects with or is parallel to the triangular patches within the neighborhood includes:

Define $\Delta abc$ as a triangular patch in P1, and $\Delta mnq$ as a triangular patch in P2' within the neighborhood of $\Delta abc$.

(1) Calculate plane equations and normal vectors $\vec{n}_1$ and $\vec{n}_2$ of $\Delta abc$ and $\Delta mnq$.

(2) When $\vec{n}_1 \cdot \vec{n}_2 <$ Threshold and $\vec{n}_1 \cdot \vec{n}_2 > -$Threshold, $\Delta abc$ is parallel to $\Delta mnq$, where Threshold>0, and Threshold is a preset threshold.

Preferably, Threshold is $10^{-6}$.

(3) When $\vec{n}_1 \cdot \vec{n}_2 >$ Threshold and $\vec{n}_1 \cdot \vec{n}_2 < -$Threshold, $\Delta abc$ intersects with $\Delta mnq$. In this case, according to the Moller method, determine whether an intersection of a side of $\Delta mnq$ and the $\Delta abc$ plane is within $\Delta abc$. If the intersection of the side of $\Delta mnq$ and the $\Delta abc$ plane is within $\Delta abc$, $\Delta abc$ intersects with $\Delta mnq$; otherwise, $\Delta mnq$ intersects with the $\Delta abc$ plane.

In step (4-4), if the triangular patch $\Delta abc$ in P1 is parallel to the triangular patch $\Delta mnq$ in P2' within the neighborhood, then:

(I-1) Calculate a distance between the $\Delta abc$ plane and the $\Delta mnq$ plane.

If the distance is greater than a preset moving distance threshold, skip adjusting $\Delta mnq$.

If the distance is less than or equal to the preset moving distance threshold, calculate a distance between normals of $\Delta abc$ and $\Delta mnq$ that cross the centroids of the triangles. If the distance is greater than a preset threshold, skip adjusting $\Delta mnq$; and if the distance is less than or equal to the preset threshold, calculate a median plane of $\Delta abc$ and $\Delta mnq$, and project three vertices of $\Delta mnq$ onto the median plane along a normal direction of the median plane, to obtain $\Delta m'n'q'$.

(I-2) Iteratively calculate a distance between the $\Delta abc$ plane and the $\Delta m'n'q'$ plane, and repeat step (I-1) until the distance is less than a final distance threshold to obtain a point cloud of a new triangular patch.

In step (4-4), if the triangular patch $\Delta abc$ in P1 intersects with the triangular patch $\Delta mnq$ in P2' within the neighborhood, then:

(II-1) Calculate an angle between the $\Delta abc$ plane and the $\Delta mnq$ plane.

If the angle is greater than an initial angle threshold, skip adjusting $\Delta mnq$.

If the angle is less than or equal to the initial angle threshold, calculate a median plane of Δabc and Δmnq, and project three vertices of Δmnq onto the median plane along a normal direction of the median plane to obtain Δm'n'q'.

(II-2) Iteratively calculate the angle between the Δabc plane and the Δm'n'q' plane, and repeat step (II-1) until the angle is less than a final angle threshold, to obtain a point cloud of a new triangular patch.

In step (4-4), if the triangular patch Δabc in P1 intersects with a plane of the triangular patch Δmnq in P2' within the neighborhood, then:

(III-1) Calculate an angle between the Δabc plane and the Δmnq plane.

If the angle is greater than an initial angle threshold, skip adjust Δmnq.

If the angle is less than or equal to the initial angle threshold, calculate a median plane of Δabc and Δmnq, and project three vertices of Δmnq onto the median plane along a normal direction of the median plane to obtain Δm'n'q'.

Calculate a connection line distance between the projected points m', n', and q' and the origins m, n, and q. If the distance is greater than a preset moving distance threshold, skip adjust Δmnq; and if the distance is less than or equal to the preset moving distance threshold, perform step (III-2).

(III-2) Iteratively calculate the angle between the Δabc plane and the Δm'n'q' plane, and repeat step (III-1) until the angle is less than a final angle threshold, to obtain a point cloud of a new triangular patch.

Adjust point clouds of each new triangular patch to obtain a point cloud P2".

Add the points in P2' that do not form a triangular patch to P2", and then perform downsampling to reduce local point cloud density and obtain a point set P2' deal.

Transform a coordinate system of a third point cloud P3 to the coordinate system of the first point cloud P1 to obtain a point cloud P3'. Specifically, carry out coarse registration and fine registration for the first point cloud P1 and the second point cloud P2 through the FPFH algorithm and the ICP algorithm in turn to obtain a transformation matrix To2; update Tg so that Tg=Tg×To2; and apply Tg to P3, so that a coordinate system of P3 is transformed to the coordinate system of P1 to obtain a point cloud P3'.

Repeat steps (4-2) to (4-5) for P2 and P3' to obtain P3' deal. Perform the preceding operations for the subsequently obtained point cloud data. Finally, integrate all Pi' deal with P1 to obtain complete point cloud data of the plant.

There are some discrete noisy points in the point cloud data of the plant after registration and optimization. Use statistical filtering to remove the discrete noisy points to obtain the final point cloud data.

Compared with the prior art, the present invention has the following beneficial effects.

(1) The method of the present invention has low requirements for shooting and acquisition conditions, and can improve the quality of point clouds without additional marking points for registration.

(2) In the method of the present invention, camera-based acquisition and rotation control of the turntable can be performed simultaneously or separately. Compared with the traditional high-precision shooting method and the shooting method with marking points, the method of performing acquisition and turntable rotation control simultaneously is more flexible with a fast acquisition speed, high efficiency, and good data stability.

(3) The present invention can effectively solve the local point cloud layering phenomenon, allowing the points to move to more suitable positions for smoothing.

(4) The present invention has low requirements for the point cloud format and can process ordered point clouds and unordered point clouds.

(5) Compared with the traditional method of applying fast point feature histograms (FPFH) and iterative closest point (ICP) to all points, the proposed method improves the quality of point clouds by eliminating the layering phenomenon. Meanwhile, the method in the present invention allows storage of only the required point cloud data, thereby saving memory space.

(6) The present invention is mainly applicable to plant leaves and objects of similar materials, and can effectively eliminate the layering phenomenon that occurs after global registration.

DETAILED DESCRIPTION

The following further describes the present invention in detail with reference to the accompanying drawings and examples. It should be noted that the examples described below are intended to facilitate the understanding of the present invention, but are not intended to impose any limitation on the present invention.

Figure 1:
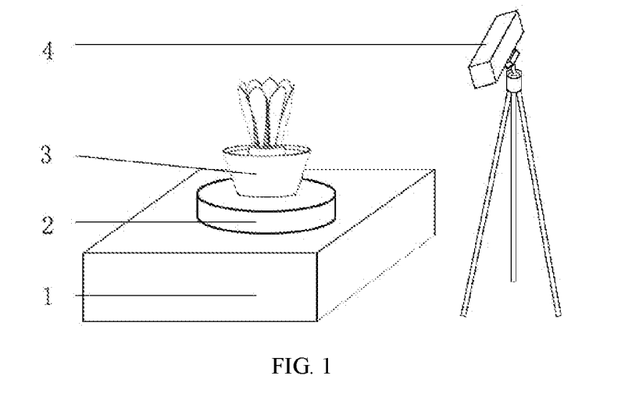
FIG. 1 is a schematic structural diagram of an acquisition device used in a plant point cloud acquisition, registration, and optimization method according to the present invention.

As shown in FIG. 1, an acquisition device required by the method of the present invention is relatively simple. Only a turntable 2 and a camera 4 are required to acquire and shoot a plant object 3, and a flat tabletop 1 is used for subsequent through-pass filtering.

Figure 2:
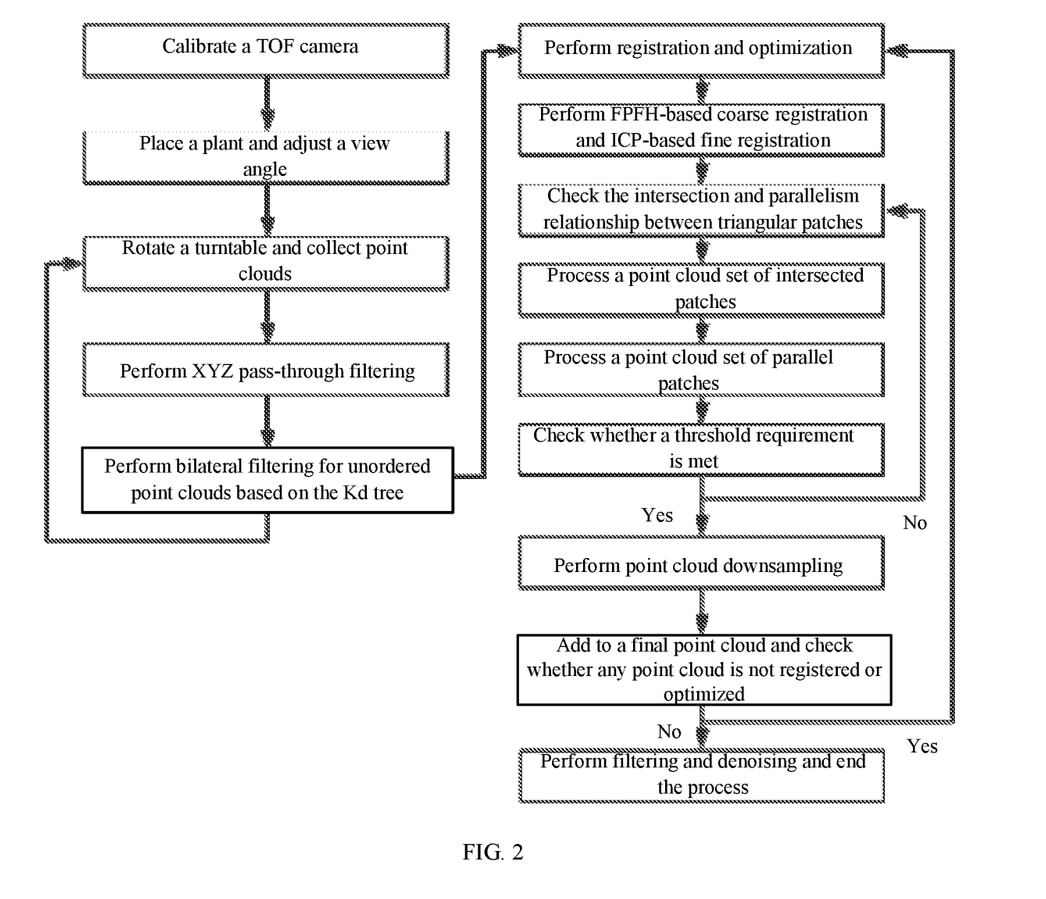
FIG. 2 is a schematic flow diagram of a plant point cloud acquisition, registration, and optimization method according to the present invention.

As shown in FIG. 2, the process of a plant point cloud acquisition, registration, and optimization method the present invention is as follows:

(1) Before photographing, calibrate a TOF camera to ensure that depth information of point cloud data and RGB image mapping obtained by the TOF camera are accurate. Zhang Zhengyou calibration method is used. Shoot checkerboard images from the same view angle under a visible light source and a near-infrared light source, respectively, shoot images from multiple view angles, and then use Zhang Zhengyou method for calibration. After calibration, perform coordinate transformation and fusion for a range image to obtain 3D point cloud data.

(2) Place a to-be-tested plant (in a round or square pot) on the center of a turntable, adjust a view angle of the TOF camera (a high angle of 30° to 45° is suitable), and align the TOF camera with the to-be-tested plant. As there is an angle between the view angle of the TOF camera and a central axis of the plant (or a central axis of the turntable), to ensure that only point cloud data of the plant and the pot is retained after the subsequent pass-through filtering, it is necessary to rotate the data to adjust the view angle.

In the method of the present invention, a random sample consensus (RANSAC) plane fitting method is used to obtain a tabletop plane. When the point cloud data is complete, there are many objects, such as the background, plant, and turntable. Therefore, the extreme pass-through filtering is initially adopted so that only part of the visible tabletop is retained. After the RANSAC plane fitting, multiple fitted planes (plane1, plane2, plane3, ...) are obtained, together with normal vectors of the corresponding fitted planes. The tilt angle of the camera is in the range of 30° to 45°, while an angle θ between a normal vector of the tabletop and the y-axis of a right-hand coordinate system is the smallest and a y-component $n_y$ of a normal is large. This prevents local discrete points from affecting the identification of the tabletop objects. Therefore, a fitted plane of the tabletop is determined based on an angle relationship between the normal vector of the fitted plane and the y-axis of the right-hand coordinate system and a point cloud quantity threshold $num_{threshold}$. That is, the fitted plane of the tabletop meets the following formulas:

$$\min\{\theta, \theta = \arccos(\vec{n}_{fitted\ plane}, \vec{y})\} \quad (1)$$

$$\max\{n_y, n_y \in \{n_y^i, i=1,2\ldots m\}\} \quad (2)$$

$$num_{plane} \geq num_{threshold} \quad (3)$$

$\vec{n}_{fitted\ plane}$ is the normal vector of the fitted plane; $\vec{y}$ is the y-axis of the right-hand coordinate system; θ is the angle between the normal vector of the fitted plane and the y-axis of the right-hand coordinate system; $n_y^i$ is a y-axis component of the normal vector of each fitted plane, m is a quantity of fitted planes, and $n_y$ is a y-axis component of a normal of the fitted plane; $num_{plane}$ is a quantity of point clouds of the fitted plane; and $num_{threshold}$ is the point cloud quantity threshold.

After determining the fitted plane of the tabletop, obtain the angle between its normal vector and each axis of the right-hand coordinate system. All point clouds captured by the camera will be rotated based on this angle.

The point cloud quantity threshold $num_{threshold}$ needs to be determined after multiple tests based on a specific sensor and a acquired object.

(3) Turn on the turntable so that it rotates automatically. The TOF camera starts to automatically acquire point cloud data and cache it in the computer memory (also save it to a hard disk for backup). To avoid occupying a lot of memory space, use pass-through filtering to preliminarily remove the background data from the obtained point cloud data.

As the point cloud data has been rotated in step 2, perform segmentation based on distances of the x-axis, y-axis, and z-axis separately, so that only the point cloud data of the plant and the pot is retained. The preceding operation can be performed in real time. The resulting point clouds are unordered point clouds.

Because the TOF camera has a low signal-to-noise ratio, and the point clouds obtained after self calibration are unordered point clouds, bilateral filtering suitable for unordered point clouds is used for smoothing. A first frame of point cloud data is used as an example.

1) Construct a KD tree, input the point cloud, and calculate a normal vector of each point of the point cloud.

2) Specify a quantity of point cloud searches in the neighborhood, search for neighboring points of each point and a normal vector of each neighboring point through the KD tree, and extract and store them to a new point cloud container and a normal vector container.

A quantity of neighboring points of the point cloud to be searched on the KD tree, and a neighboring point quantity threshold are mentioned in this patent. This threshold needs to be determined through multiple tests based on a specific sensor and acquired object data. In the example of this patent, a Kinect camera is used to acquire data of an oilseed rape plant, and a neighboring point quantity threshold is set to 30.

3) Perform smoothing and denoising according to the principle of image-based bilateral filtering. The formulas are as follows:

$$\alpha = \frac{\sum\limits_{p \in PcNei} (W_c(\|Pc - P\|)W_s(\|Pc - P, Pn\|)(\overrightarrow{Pc - P} * \overrightarrow{Pn}))}{\sum\limits_{p \in PcNei} W_c(\|Pc - P\|)W_s(\|Pc - P, Pn\|)} \quad (4)$$

$$P' = Pc + \alpha * Pn \quad (5)$$

Pc is the selected point, Pn is a normal of the selected point, α is an adjustment coefficient, P' is a processed point cloud, PcNei is a set of the neighboring points of selected point, p is a point in the neighboring point set, and Wc and Ws are two weight functions.

The smoothened point cloud data will be registered and optimized.

(4) Perform registration and optimization concurrently with acquisition. Process the point cloud data in the memory space. A first point cloud P1 and a second point cloud P2 are used as examples.

1) Initialize a global matrix Tg as a 4×4 unit matrix.

2) Carry out coarse registration and fine registration for P1 and P2 through an FPFH algorithm and an ICP algorithm in turn to obtain a transformation matrix To and apply it to P2, so that its coordinate system is transformed to a coordinate system of P1 to obtain P2'; and update Tg so that Tg=Tg×To.

3) Triangulate P1 and P2' respectively through greedy triangulation, and then remove edge points that do not form a triangular patch. This is because the edge points that do not form a triangular patch are usually noisy points, but points inside that do not form a triangular patch are not necessarily noisy points. Therefore, only an edge point set is removed.

A removed point meets the following requirements: 1. The point does not form a triangular patch. 2. The point is a boundary point found using a KD tree and normal vector method. (Specifically, search for neighboring points through the KD tree, and determine the point as an outlier when a quantity of neighboring points is less than a threshold. Calculate a normal vector of the point based on the quantity of neighboring points by using a PCA method, and calculate an angle between the normal vector and a line connecting a view point and the point. If the angle is greater than a threshold, determine the point as a flying pixel point. The outlier and the flying pixel point are boundary points and need to be removed).

4) Check the intersection relationship between P1 and P2': Search for a triangular patch of P2' in the neighborhood of each triangular patch in P1, and check whether the triangular patch in P1 intersects with or is parallel to the triangular patch in the neighborhood. Δabc in P1 and Δmnq in P2 are used as examples.

Calculate plane equations and normal vectors $\vec{n}_1$ and $\vec{n}_2$ of Δabc and Δmnq through a three-point method.

When $\vec{n}_1 \cdot \vec{n}_2 >$Threshold(Threshold>0) and $\vec{n}_1 \cdot \vec{n}_2 < -$Threshold, two normals intersect. In this case, according to the Moller method, determine whether an intersection of each side of Δmnq and the Δabc plane is within Δabc and whether the intersection is on each side line segment.

Figure 3:
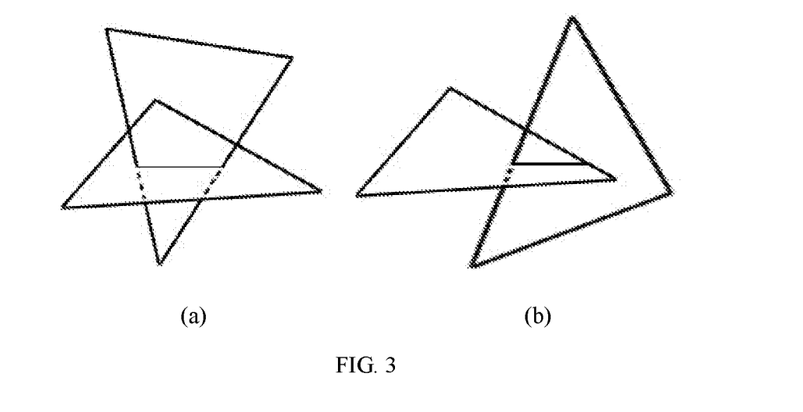
FIG. 3 is a schematic diagram illustrating that two triangular patches intersect with each other, where (a) and (b) show two intersection cases.
Figure 4:
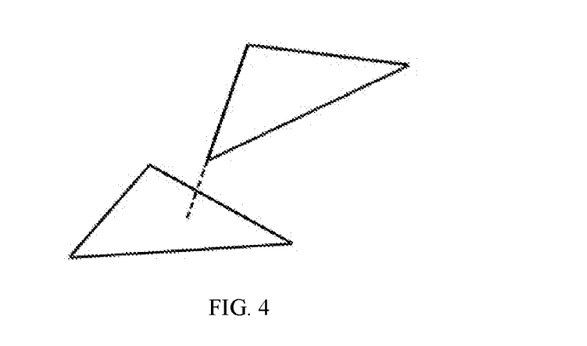
FIG. 4 is a schematic diagram illustrating that one triangular patch intersects with another.

As shown in FIG. 3, if the intersection is on the line segment and within Δabc, Δabc and Δmnq intersect (case 1). As shown in FIG. 4, if the intersection is within Δabc but on a side radial, Δmnq and Δabc intersect (case 2). In other cases, the triangular patches do not intersect.

Figure 5:
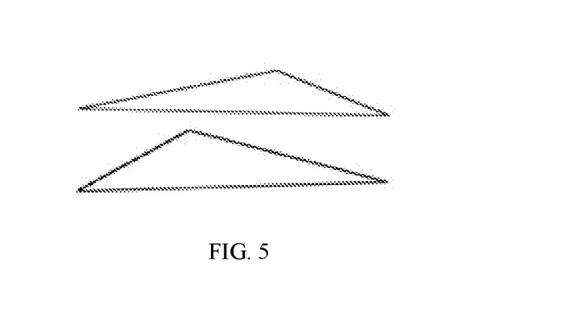
FIG. 5 is a schematic diagram illustrating that two triangular patches are in parallel.

When $\vec{n}_1 \cdot \vec{n}_2 <$Threshold and $\vec{n}_1 \cdot \vec{n}_2 >-$Threshold, the two normals are in parallel, as shown in FIG. 5.

Figure 6:
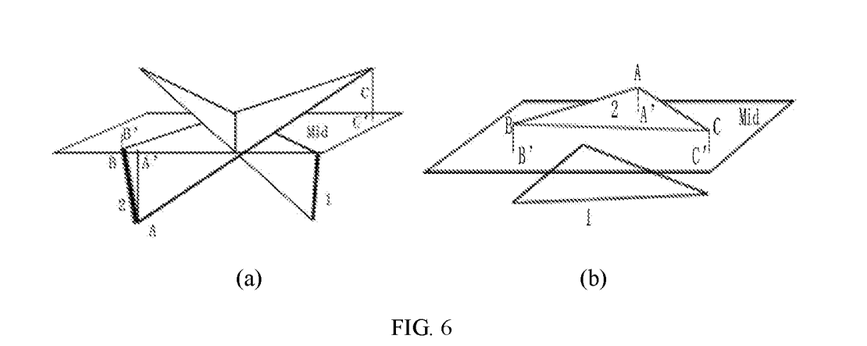
FIG. 6 is a schematic diagram of adjusting a point cloud set of triangular patches, where (a) shows that two triangular patches intersect with each other, and (b) shows two triangular patches are in parallel.

5) Adjust a cloud point set of intersected patches, as shown in (a) in FIG. 6.

As shown in FIG. 3, if the triangle patches intersect (case 1), and an angle between the two triangular patches is greater than a preset initial angle threshold (which indicates that a difference between the two triangular patches is large, their geometric centers are similar, but they are not approximately matched triangular patches), do not perform any operation; if the angle is less than or equal to the initial angle threshold, project three vertices of Δmnq onto a median plane along a normal vector direction of the median plane, to obtain and store Δm'n'q'.

If one triangular patch intersects with another triangular plane (case 2 in FIG. 4), and the angle between the two triangular patches is greater than the preset initial angle threshold, do not perform any operation; otherwise, project three vertices of Δmnq onto a median plane along a normal vector direction of the median plane, to obtain Δm'n'q', and check a connection line distance between the projected points m', n', and q' and the origins m, n, and q. If the distance is greater than a preset moving distance threshold, do not perform any operation; if the distance is less than or equal to the preset moving distance threshold, store Δm'n'q'.

6) Adjust a cloud point set of the parallel patches, as shown in (b) in FIG. 6.

If the triangular patches are parallel to each other, calculate a planar distance between the two triangular patches. If the distance is greater than a preset moving distance threshold, indicating a large distance between the two planes, do not perform any operation; if the distance is less than or equal to the preset moving distance threshold, calculate a distance between normals of the two triangular patches that cross the centroids of the triangles, and ensure that Δmnq basically corresponds to Δabc. If the distance between the normals is greater than a preset threshold, do not perform any operation; if the distance between the normals is less than or equal to the preset threshold, indicating that the triangular patches are approximately parallel, project three vertices of Δmnq onto a median plane along a normal direction of the median plane, to obtain and store Δm'n'q'.

After the preceding calculations, store the intersection relationship in a new data set. Each data object in the data set contains the following data types: a triangular patch Δabc of P1 (the coordinates of the three vertices of Δabc and the numbers in P1), Δm'n'q' in P2 that is stored and intersects with or is parallel to Δabc (the coordinates of the three vertices of Δm'n'q' and the numbers in P2), and an intersection or parallelism relationship between the two triangular patches (intersection case 1 is denoted as 1, intersection case 2 is denoted as 2, a parallel case is denoted as 3, and other cases (cases in which no operation is performed in steps 5) and 6) are denoted as 0). Δm'n'q' and its intersection or parallelism relationship are stored together.

7) Iterative processing: After the preceding processing, the new triangular patch Δm'n'q' can be obtained. Calculate its intersection with Δabc. After the angle between the intersected planes is less than a preset final threshold (the threshold herein is a final angle), and the distance between the parallel planes is less than a preset final threshold (the threshold herein is a final distance), determine that the triangle patches have been optimized, and stop iteration.

After the iteration is completed, integrate all the point clouds in the new triangular patch to obtain a point cloud P2".

8) Point cloud downsampling: Because a point may be reused, a quantity of processed point clouds P2" is more than the original data. In addition, the triangular patches that are not operated in the above process are outliers within the neighborhood, and cannot be removed as outlier noises. Therefore, retain the unprocessed points in P2', and remove the original position points of the vertices of the triangle patches with the intersection relationships 1, 2, 3, and 0 (in this case, the outliers are removed). Add a processed point set, and select appropriate parameters for downsampling to reduce the local point cloud density and obtain a new processed point set P2'deal.

9) Read a third point cloud P3 in the memory space, use the FPFH and ICP algorithms to process P3 and P2 to calculate a transformation matrix To2, and then update Tg so that Tg=Tg×To2. Apply Tg to P3, and transform its coordinate system to the coordinate system of P1 to obtain P3'. Repeat the steps 3) to 8) for P3' and P2'deal to process the read point cloud data in the same way.

10) Integrate P1 with all Pi'deal (i∈2−n) to obtain complete point cloud data.

Figure 7:
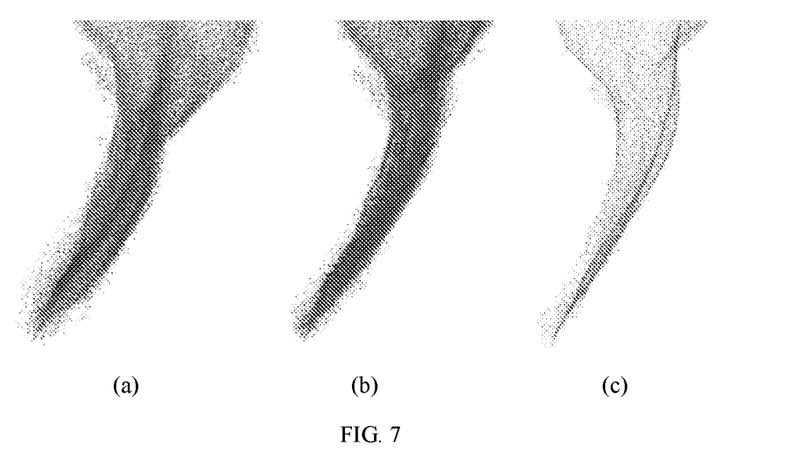
FIG. 7 is a schematic diagram showing point clouds before and after being processed using a plant point cloud acquisition, registration, and optimization method, where (a) shows the point clouds before optimization, (b) shows the point clouds after optimization (without downsampling and noise reduction), and (c) shows the point clouds after optimization (with downsampling and noise reduction).

In the preceding process, complete cloud point registration and partial layering optimization are done, but there are some discrete noises in the point clouds, and further processing through statistical filtering is required to obtain the final point cloud. The final effect is shown in FIG. 7, where (a) shows the point clouds before optimization, (b) shows the point clouds after optimization (without downsampling and noise reduction), and (c) shows the point clouds after optimization (with downsampling and noise reduction).

The technical solutions and beneficial effects of the present invention are further described in detail in the foregoing examples. It should be understood that the above are only the specific examples of the present invention, and are not intended to limit the present invention. Any modifications, equivalent substitutions and improvements and the like made within the principles of the present invention should fall within the protection scope of the present invention.

What is claimed is:

1. A plant point cloud acquisition, registration, and optimization method based on a time of flight (TOF) camera, comprising:

(1) placing a to-be-tested plant on a turntable, adjusting a view angle of the TOF camera, and aligning the TOF camera with the to-be-tested plant;

(2) turning on the turntable so that it rotates automatically, and enabling the TOF camera to acquire point cloud data of the to-be-tested plant at intervals;

(3) performing real-time preprocessing on each frame of point cloud data acquired by the TOF camera;

(4) performing registration and optimization on every two adjacent frames of point cloud data, and then integrating the data to obtain complete plant point cloud data, comprising:

(4-1) transforming a coordinate system of a second point cloud P2 to a coordinate system of a first point cloud P1 to obtain a point cloud P2';

(4-2) triangulating P1 and P2', removing boundary points that do not form a triangular patch, but retaining points inside that do not form a triangular patch;

(4-3) searching for a triangular patch of P2' within the neighborhood of each triangular patch in P1, and checking whether the triangular patch in P1 intersects with or is in parallel to the triangular patches within the neighborhood;

(4-4) according to the intersection and parallelism relationship, adjust a point cloud set of P2' that is within the neighborhood of the triangular patch in P1 to obtain a point cloud P2";

(4-5) adding points in P2' that do not form a triangular patch to P2", and then performing downsampling to obtain a point set P2'deal;

(4-6) transforming a coordinate system of an i-th point cloud Pi to the coordinate system of the first point cloud P1 to obtain a point cloud Pi', and repeating steps (4-2) to (4-5) to obtain Pi'deal, wherein i≥3; and (4-7) integrating P1, P2'deal, and Pi'deal to obtain the complete plant point cloud data; and (5) using statistical filtering to remove the discrete noise in the plant point cloud data obtained in the registration and optimization process to obtain final point cloud data.

2. The plant point cloud acquisition, registration, and optimization method based on a TOF camera according to claim 1, wherein step (1) comprises:

(1-1) calibrating the TOF camera with Zhang Zhengyou method, placing the to-be-tested plant on the turntable, adjusting the view angle of the TOF camera, and aligning the TOF camera with the to-be-tested plant; and (1-2) using a plane fitting method to obtain a fitted plane of a tabletop, and obtaining an angle between a normal vector of the fitted plane of the tabletop and each axis of a right-hand coordinate system.

3. The plant point cloud acquisition, registration, and optimization method based on a TOF camera according to claim 2, wherein step (1-2) comprises:

(1-2a) performing extreme pass-through filtering on each frame of point cloud data so that only part of the visible tabletop is retained;

(1-2b) obtaining multiple fitted planes through random sample consensus (RANSAC) plane fitting, obtaining a normal vector of each fitted plane, and determining the fitted plane of the tabletop based on an angle relationship between the normal vector of the fitted plane and the y-axis of the right-hand coordinate system and a point cloud quantity threshold, wherein the fitted plane of the tabletop meets the following formulas:

$$\min\{\theta, \theta = \arccos(\vec{n}_{fitted\ plane}, \vec{y})\} \quad (1)$$

$$\max\{n_y, n_y \in \{n_y^i, i=1,2 \ldots m\}\} \quad (2)$$

$$num_{plane} \geq num_{threshold} \quad (3)$$

wherein $\vec{n}_{fitted\ plane}$ is the normal vector of the fitted plane; $\vec{y}$ is the y-axis of the right-hand coordinate system; $\theta$ is the angle between the normal vector of the fitted plane and the y-axis of the right-hand coordinate system; $n_y^i$ is a y-axis component of the normal vector of each fitted plane, m is a quantity of fitted planes, and $n_y$ is a y-axis component of a normal of the fitted plane; $num_{plane}$ is a quantity of point clouds of the fitted plane; and $num_{threshold}$ is the point cloud quantity threshold; and (1-2c) after determining the fitted plane of the tabletop, obtaining the angle between the normal vector of the fitted plane of the tabletop and each axis of the right-hand coordinate system.

4. The plant point cloud acquisition, registration, and optimization method based on a TOF camera according to claim 1, wherein step (3) comprises:

(3-1) rotating each frame of the point cloud data acquired by the TOF camera according to an angle between a normal vector of a fitted plane of a tabletop and each axis of a right-hand coordinate system;

(3-2) performing pass-through filtering on the rotated point cloud data to remove background and obtain an unordered point cloud; and (3-3) using bilateral filtering to smoothen the unordered point cloud.

5. The plant point cloud acquisition, registration, and optimization method based on a TOF camera according to claim 1, wherein the step (4-2) of searching for boundary points based on a KD tree and normal vector method comprises:

(4-2a) searching for neighboring points of a point that does not form a triangular patch through the KD tree, wherein when a quantity of neighboring points of a point is less than a threshold, the point is an outlier; and (4-2b) according to the quantity of neighboring points of the point that does not form a triangular patch, using a PCA method to calculate a normal vector of the point, determining a connection line between a view point and the point, and calculating an angle between the connection line and the normal vector, wherein if the angle is greater than a threshold, the point is a flying pixel point; and both outliers and flying pixel points are boundary points.

6. The plant point cloud acquisition, registration, and optimization method based on a TOF camera according to claim 5, wherein in step (4-4), if a triangular patch Δabc in P1 is parallel to a triangular patch Δmnq of P2' within the neighborhood, then:

(l-1) calculating a distance between the Δabc plane and the Δmnq plane;

if the distance is greater than a preset moving distance threshold, skipping adjusting Δmnq;

if the distance is less than or equal to the preset moving distance threshold, calculating a distance between normals of Δabc and Δmnq that cross the centroids of the triangles; if the distance is greater than a preset threshold, skipping adjusting Δmnq; and if the distance is less than or equal to the preset threshold, calculating a median plane of Δabc and Δmnq, and projecting three vertices of Δmnq onto the median plane along a normal direction of the median plane, to obtain Δm'n'q; and (I-2) iteratively calculating a distance between the Δabc plane and the Δm'n'q' plane, and repeating step (I-1) until the distance is less than a final distance threshold to obtain a point cloud of a new triangular patch.

7. The plant point cloud acquisition, registration, and optimization method based on a TOF camera according to claim 5, wherein in step (4-4), if a triangular patch Δabc in P1 intersects with a triangular patch Δmnq of P2' within the neighborhood, then:
   (II-1) calculating an angle between the Δabc plane and the Δmnq plane;
   if the angle is greater than an initial angle threshold, skipping adjusting Δmnq;
   if the angle is less than or equal to the initial angle threshold, calculating a median plane of Δabc and Δmnq, and projecting three vertices of Δmnq onto the median plane along a normal direction of the median plane to obtain Δm'n'q'; and
   (II-2) iteratively calculating the angle between the Δabc plane and the Δm'n'q' plane, and repeating step (II-1) until the angle is less than a final angle threshold, to obtain a point cloud of a new triangular patch.

8. The plant point cloud acquisition, registration, and optimization method based on a TOF camera according to claim 5, wherein in step (4-4), if a triangular patch Δabc in P1 intersects with a plane of a triangular patch Δmnq of P2' within the neighborhood, then:
   (III-1) calculating an angle between the Δabc plane and the Δmnq plane;
   if the angle is greater than an initial angle threshold, skipping adjusting Δmnq;
   if the angle is less than or equal to the initial angle threshold, calculating a median plane of Δabc and Δmnq, and projecting three vertices of Δmnq onto the median plane along a normal direction of the median plane to obtain Δm'n'q';
   calculating a connection line distance between the projected points m', n', and q' and the origins m, n, and q; if the distance is greater than a preset moving distance threshold, skipping adjusting Δmnq; and if the distance is less than or equal to the preset moving distance threshold, performing step (III-2); and
   (III-2) iteratively calculating the angle between the Δabc plane and the Δm'n'q' plane, and repeating step (III-1) until the angle is less than a final angle threshold, to obtain a point cloud of a new triangular patch.

9. The plant point cloud acquisition, registration, and optimization method based on a TOF camera according to claim 1, wherein the step (4-3) of checking whether the triangular patch in P1 intersects with or is in parallel to the triangular patches within the neighborhood comprises:
   defining Δabc as a triangular patch in P1, and Δmnq as a triangular patch in P2' within the neighborhood of Δabc;
   (1) calculating plane equations and normal vectors $\vec{n}_1$ and $\vec{n}_2$ of Δabc and Δmnq;
   (2) when $\vec{n}_1 \cdot \vec{n}_2 <$ Threshold and $\vec{n}_1 \cdot \vec{n}_2 > -$Threshold, Δabc is parallel to Δmnq, wherein Threshold>0, and Threshold is a preset threshold; and
   and (3) when $\vec{n}_1 \cdot \vec{n}_2 >$ Threshold and $\vec{n}_1 \cdot \vec{n}_2 < -$Threshold, Δabc intersects with Δmnq; in this case, according to the Moller method, determining whether an intersection of a side of Δmnq and the Δabc plane is within Δabc; if the intersection of the side of Δmnq and the Δabc plane is within Δabc, Δabc intersects with Δmnq; otherwise, Δmnq intersects with the Δabc plane.

* * * * *